(12) United States Patent
Zhan et al.

(10) Patent No.: US 10,678,102 B2
(45) Date of Patent: Jun. 9, 2020

(54) CURVED DISPLAY PANEL AND CURVED DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Hongming Zhan, Beijing (CN); Xue Dong, Beijing (CN); Xibin Shao, Beijing (CN); Ming Chen, Beijing (CN); Yu Ma, Beijing (CN); Chao Tian, Beijing (CN); Xiao Wang, Beijing (CN); Yupeng Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/519,621

(22) PCT Filed: Nov. 7, 2016

(86) PCT No.: PCT/CN2016/104916
§ 371 (c)(1),
(2) Date: Apr. 17, 2017

(87) PCT Pub. No.: WO2017/088636
PCT Pub. Date: Jun. 1, 2017

(65) Prior Publication Data
US 2017/0357132 A1 Dec. 14, 2017

(30) Foreign Application Priority Data
Nov. 24, 2015 (CN) .......................... 2015 1 0824572

(51) Int. Cl.
*G02F 1/1343* (2006.01)
*G02F 1/1335* (2006.01)

(52) U.S. Cl.
CPC .... *G02F 1/134336* (2013.01); *G02F 1/13439* (2013.01); *G02F 1/133512* (2013.01);
(Continued)

(58) Field of Classification Search
CPC ... G02F 1/133305; G02F 2001/133305; G02F 2001/133368; G02F 2201/56; G06F 1/1652; G09G 2380/02
See application file for complete search history.

(56) References Cited

U.S. PATENT DOCUMENTS

2005/0248700 A1* 11/2005 Takagi .............. G02F 1/136227
349/110
2008/0158464 A1 7/2008 Chang et al.
(Continued)

FOREIGN PATENT DOCUMENTS

CN 101140394 A 3/2008
CN 101211078 A 7/2008
(Continued)

OTHER PUBLICATIONS

International Search Report & Written Opinion dated Jan. 26, 2017 regarding PCT/CN2016/104916.
(Continued)

*Primary Examiner* — Michael H Caley
*Assistant Examiner* — Mariam Qureshi
(74) *Attorney, Agent, or Firm* — Intellectual Valley Law, P.C.

(57) ABSTRACT

The present application discloses a curved display panel having an array substrate including an array of subpixels arranged in rows and columns. The array substrate includes a plurality of pixel electrodes corresponding to the array of
(Continued)

subpixels; each of the plurality of pixel electrodes being in a subpixel and having a first dimension along a row direction and a second dimension along a column direction. The curved display panel is curved with respect to an axis substantially parallel to the column direction; and the first dimension is larger than the second dimension.

20 Claims, 10 Drawing Sheets

(52) U.S. Cl.
CPC ............... *G02F 1/134309* (2013.01); *G02F 2001/134345* (2013.01); *G02F 2201/123* (2013.01); *G02F 2203/64* (2013.01)

(56) References Cited

U.S. PATENT DOCUMENTS

| | | | |
|---|---|---|---|
| 2008/0259256 A1 | 10/2008 | Dong | |
| 2009/0161048 A1 | 6/2009 | Satake et al. | |
| 2011/0013129 A1* | 1/2011 | Jeong | G02F 1/133707 349/141 |
| 2012/0257150 A1* | 10/2012 | Wu | G02F 1/136209 349/106 |
| 2014/0354921 A1* | 12/2014 | Lee | G02F 1/1341 349/89 |
| 2015/0160488 A1 | 6/2015 | Kim et al. | |
| 2016/0026050 A1* | 1/2016 | Lin | G02F 1/136286 349/43 |
| 2016/0109763 A1* | 4/2016 | Seo | G02F 1/134336 257/72 |
| 2016/0139458 A1 | 5/2016 | Ma | |
| 2016/0202565 A1* | 7/2016 | Jeong | G02F 1/133707 349/43 |
| 2016/0342034 A1 | 11/2016 | Wu | |
| 2017/0045794 A1* | 2/2017 | Lin | G02F 1/134336 |
| 2018/0364528 A1* | 12/2018 | Yeh | G02F 1/136286 |

FOREIGN PATENT DOCUMENTS

| | | |
|---|---|---|
| CN | 101290410 B | 10/2008 |
| CN | 101464582 A | 6/2009 |
| CN | 104375339 A | 2/2015 |
| CN | 102768445 B | 4/2015 |
| CN | 104503156 A | 4/2015 |
| CN | 105116654 A | 12/2015 |
| CN | 205121121 U | 3/2016 |
| JP | 2003322867 A | 11/2003 |

OTHER PUBLICATIONS

First Office Action in the Chinese Patent Application No. 201510824572. 6, dated Oct. 17, 2017; English translation attached.
The Extended European Search Report in the European Patent Application No. 16852870.1, dated Mar. 27, 2019.

* cited by examiner

CURVED DISPLAY PANEL AND CURVED DISPLAY APPARATUS

CROSS-REFERENCE TO RELATED APPLICATION

This application is a national stage application under 35 U.S.C. § 371 of International Application No. PCT/CN2016/104916 filed Nov. 7, 2016, which claims priority to Chinese Patent Application No. 201510824572.6, filed Nov. 24, 2015, the contents of which are incorporated by reference in the entirety.

TECHNICAL FIELD

The present invention relates to display technology, more particularly, to a curved display panel and a curved display apparatus.

BACKGROUND

Convention display apparatuses are usually flat display apparatuses. In recent years, display devices having a curved display surface have been proposed for design or other reasons. Curved display apparatuses have found applications in computer monitors, televisions, personal portable devices, and display screen mounted in a vehicle.

SUMMARY

In one aspect, the present invention provides a curved display panel having an array substrate comprising an array of subpixels arranged in rows and columns, the array substrate comprising a plurality of pixel electrodes corresponding to the array of subpixels; each of the plurality of pixel electrodes being in a subpixel and having a first dimension along a row direction and a second dimension along a column direction; wherein the curved display panel is curved with respect to an axis substantially parallel to the column direction; and the first dimension is larger than the second dimension.

Optionally, each of the plurality of pixel electrodes has a rectangular shape, a short side of which is substantially parallel to the axis.

Optionally, each of the plurality of pixel electrodes has a plurality of domains and comprises at least a plurality of first branches extending along a first direction and a plurality of second branches extending along a second direction; the first direction being different from the second direction.

Optionally, a sum of areas occupied by first branches in a first region of a first subpixel and a second region of a second subpixel is substantially equal to a sum of area occupied by second branches in the first region of the first subpixel and the second region of the second subpixel; the first subpixel and the second subpixel are two adjacent subpixels along the row direction; and the first region and the second region are two equivalent regions in the first subpixel and the second subpixel, respectively; the first region and the second region are small than a pixel electrode.

Optionally, each of the plurality of pixel electrodes comprises a first domain comprising a plurality of first branches extending along the first direction and a second domain comprising a plurality of second branches extending along the second direction.

Optionally, the plurality of first branches in the first domain and the plurality of second branches in the second domain in a same subpixel have a substantially mirror symmetry with respect to each other.

Optionally, the second domain in the first subpixel is adjacent to the second domain in the second subpixel along the row direction.

Optionally, a first pattern comprising the first domain and the second domain in the first subpixel and a second pattern comprising the first domain and the second domain in the second subpixel have a substantially two-fold rotational symmetry in plan view of the array of subpixels.

Optionally, each of the plurality of pixel electrodes further comprises a third domain comprising a plurality of first branches extending along the first direction; and the first domain, the second domain, and a third domain sequentially arranged substantially along the row direction.

Optionally, the plurality of first branches in the first domain and the plurality of second branches in the second domain in a same subpixel have mirror symmetry with respect to each other; and the plurality of second branches in the second domain and the plurality of first branches in the third domain in the same subpixel have a substantially mirror symmetry with respect to each other.

Optionally, a sum of areas occupied by first branches in a first region of a first subpixel and a second region of a second subpixel is substantially equal to a sum of area occupied by second branches in the first region of the first subpixel and the second region of the second subpixel; the first subpixel and the second subpixel are two adjacent subpixels along the column direction; and the first region and the second region are two equivalent regions in the first subpixel and the second subpixel, respectively; the first region and the second region are small than a pixel electrode.

Optionally, each of the plurality of pixel electrodes comprises a first domain comprising a plurality of first branches extending along the first direction and a second domain comprising a plurality of second branches extending along the second direction.

Optionally, the first domain in the first subpixel is adjacent to the second domain in the second subpixel along the column direction; and the second domain in the first subpixel is adjacent to the first domain in the second subpixel along the column direction.

Optionally, a first pattern comprising the first domain and the second domain in the first subpixel and a second pattern comprising the first domain and the second domain in the second subpixel have a substantially mirror symmetry with respect to each other.

Optionally, a pixel electrode in the first subpixel further comprises a third domain comprising a plurality of first branches extending along the first direction; and the first domain, the second domain, and a third domain sequentially arranged substantially along the row direction; and a pixel electrode in the second subpixel further comprises a fourth domain comprising a plurality of second branches extending along the second direction; and the second domain, the first domain, and a fourth domain sequentially arranged substantially along the row direction.

Optionally, the first domain in the first subpixel is adjacent to the second domain in the second subpixel along the column direction; the second domain in the first subpixel is adjacent to the first domain in the second subpixel along the column direction; and the third domain in the first subpixel is adjacent to the fourth domain in the second subpixel along the column direction.

Optionally, the curved display panel further comprises a black matrix layer in an inter-subpixel region of the curved display panel.

Optionally, the curved display panel further comprises a counter substrate facing the array substrate; the black matrix layer being on the counter substrate.

Optionally, each of the plurality of pixel electrodes comprises a first domain comprising a plurality of first branches extending along the first direction; a second domain comprising a plurality of second branches extending along the second direction; and a third domain comprising a plurality of first branches extending along the first direction; the first domain; the second domain, and a third domain being sequentially arranged substantially along the row direction; the plurality of first branches in the first domain and the plurality of second branches in the second domain in a same subpixel have a substantially mirror symmetry with respect to each other; the plurality of second branches in the second domain and the plurality of first branches in the third domain in the same subpixel have a substantially mirror symmetry with respect to each other; a projection of the third domain on the curved display panel overlaps with that of the black matrix layer; and a projection of the first domain and the second domain on the curved display panel is at least partially outside that of the black matrix layer.

Optionally, the curved display panel further comprises a liquid crystal layer between the array substrate and the counter substrate; wherein the black matrix layer is absent in an inter-subpixel region between adjacent subpixels along the row direction; and liquid crystal molecules in the liquid crystal layer in the inter-subpixel region between adjacent subpixels along the row direction have a rotation angle corresponding to a normally black mode.

In another aspect, the present invention provides a curved display apparatus comprising a curved display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a conventional curved display apparatus, the display panel is curved with respect to an axis. When the display panel is curved, the array substrate and the counter substrate in the display panel offset from each other. To prevent color blending due to the offset, the black matrix layer is designed to be large enough to compensate the offset. On two sides of the curved display apparatus, the array substrate shifts away from the counter substrate towards two different directions with respect to the axis. The black matrix layer patterns are different on two different sides of the curved display apparatus. Typically, the black matrix layer on both sides is designed to be large enough to at least cover any offset between the array substrate and the counter substrate.

Typically, the black matrix layer is disposed on the counter substrate, with each black matrix opening aligned with the center of a pixel electrode. When the display panel is curved, the counter substrate and the array substrate offset from each other, the black matrix opening is not aligned with the center of the corresponding pixel electrode, resulting in a loss of aperture ration. In some display apparatus, the black matrix layer is disposed on the array substrate. When the display panel is curved, the counter substrate and the array substrate offset from each other, the color filter on the counter substrate is not aligned with a corresponding pixel electrode, affecting display quality.

Figure 1:
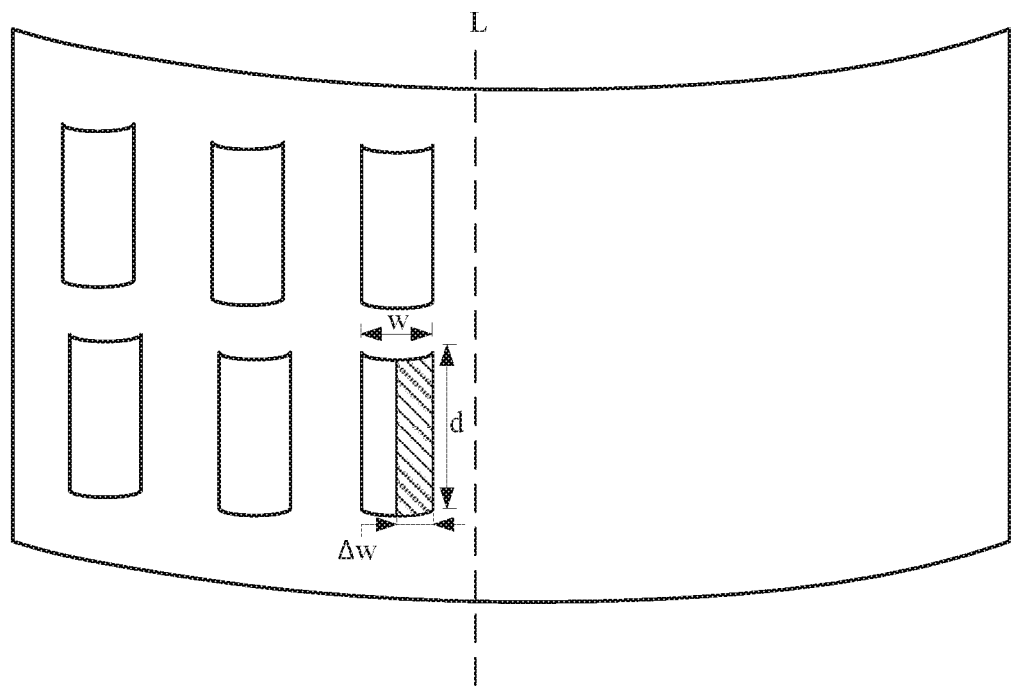
FIG. 1 is a diagram illustrating the structure of a display panel in a conventional curved display apparatus.

FIG. 1 is a diagram illustrating the structure of a display panel in a conventional curved display apparatus. Referring to FIG. 1, the pixel electrode in the display panel has a rectangular shape. The display panel is curved with respect to an axis L. As shown in FIG. 1, each rectangular shaped pixel electrode has a long side and a short side. The long side has a length d, and the short side has a width w. The rectangular shaped pixel electrodes are arranged so that a long side of each rectangular shaped pixel electrode is parallel to the axis L. When the conventional display panel is curved, each pixel electrode is shifted relative to the counter substrate by a distance Δw. As a result, each pixel electrode is offset with respect to the counter substrate by an offset region (see the shaded region in FIG. 1). The offset region has an area of Δw*d. The offset region has a relatively large area, affecting display quality in the conventional curved display apparatus.

Accordingly, the present invention provides, inter alia, a curved display panel and a curved display apparatus that substantially obviate one or more of the problems due to limitations and disadvantages of the related art. In one aspect, the present disclosure provides a curved display panel having an array substrate including an array of subpixels arranged in rows and columns. The curved display panel is curved with respect to an axis substantially parallel to the column direction. In some embodiments, the array substrate includes a plurality of pixel electrodes corresponding to the array of subpixels; each of the plurality of pixel electrodes is in a subpixel and has a first dimension along a row direction and a second dimension along a column direction. The first dimension is larger than the second dimension.

Figure 2:
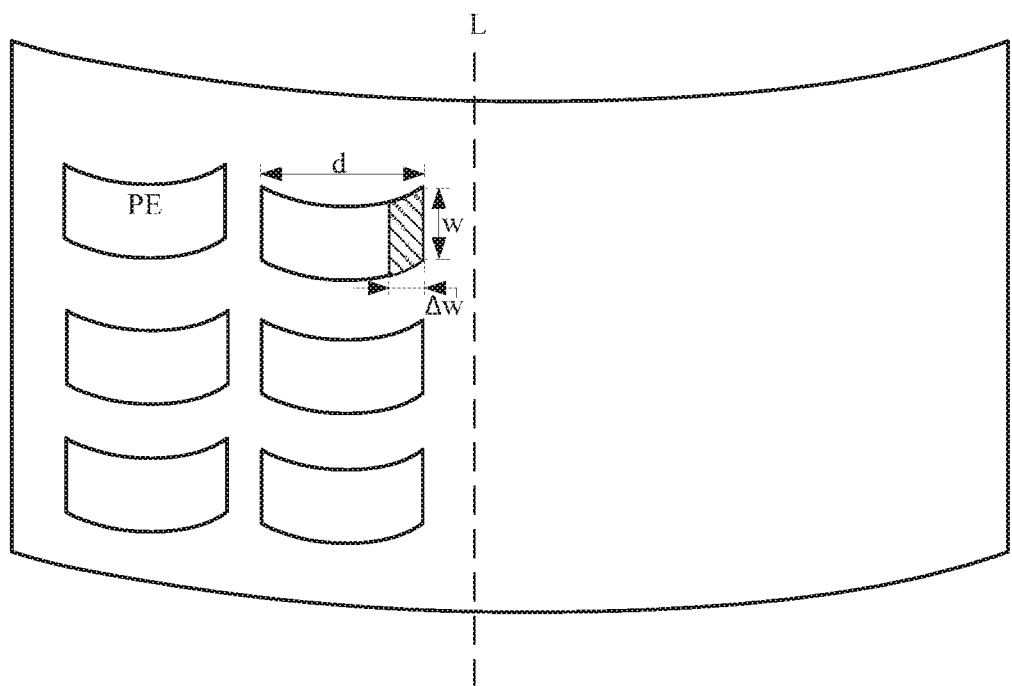
FIG. 2 is a diagram illustrating the structure of an array substrate in some embodiments according to the present disclosure.

FIG. 2 is a diagram illustrating the structure of an array substrate in some embodiments according to the present disclosure. The display panel is curved with respect to an axis L. Referring to FIG. 2, the array substrate in the embodiment includes an array of subpixels arranged in rows and columns including a plurality of pixel electrodes PE corresponding to the array of subpixels, each pixel electrode PE in a subpixel. The pixel electrode PE has a first dimension d along the row direction and a second dimension w along the column direction. Specifically, the first dimension d in FIG. 2 is a length of a long side of the pixel electrode, and the second dimension w is a width of a short side of the pixel electrode. The short side is substantially parallel to the axis L, and the long side is substantially perpendicular to the axis L.

Referring to FIG. 2, the first dimension d is larger than the second dimension w. When the display panel is curved in a present display apparatus, each pixel electrode is shifted relative to the counter substrate by a distance Δw. As a result, each pixel electrode is offset with respect to the counter substrate by an offset region (see the shaded region in FIG. 2). The offset region has an area of Δw*w. Because w is much smaller than d, the offset region has an area much smaller than that in the conventional curved display panel. The effects of the offset region on the display quality are minimized, thus the display quality in the present curved display panel is much improved as compared to the conventional curved display panel.

In some curved display panels, the black matrix layer is disposed on the counter substrate. By having an array substrate as illustrated in FIG. 2, the offset area between the black matrix layer and the pixel electrode and its effect on aperture ratio of the display apparatus can be minimized. In some curved display panels, the black matrix layer is disposed on the array substrate. By having an array substrate as illustrated in FIG. 2, the offset area between the pixel electrode and the color filter on the counter substrate and its effect on display quality can be minimized.

In FIG. 2, the pixel electrode has a rectangular shape having a long side along the row direction and a short side along the column direction. The short side is substantially parallel to the axis L, and the long side is substantially perpendicular to the axis L.

The pixel electrode may be made of any appropriate shape, e.g., a parallelogram shape, a trapezoidal shape, an irregular shape, or a shape having protrusions or cut-off portions. Regardless of the specific shape of the pixel electrode, the pixel electrodes in the present curved display panel are arranged so that a first dimension of the pixel electrode along a row direction is larger than a second dimension of the pixel electrode along a column direction when the curved display panel is curved with respect to an axis substantially parallel to the column direction. Optionally, the first dimension is a maximal dimension of the pixel electrode along the row direction. Optionally, the second dimension is a maximal dimension of the pixel electrode along the column direction.

In some embodiments, to improve color shift in a liquid crystal display apparatus, each pixel electrode may be made to have multiple domains. Each domain includes a plurality of branches (e.g., rod-shaped electrodes) extending along a substantially the same direction. The plurality of branches in each domain are spaced apart from each other, e.g., adjacent branches are spaced apart from each other by a slit. The plurality of branches in each domain are substantially parallel to each other. In some embodiments, a pattern of a plurality of branches in a domain is axisymmetrical to that in an adjacent domain in a same pixel electrode of a same subpixel. In some embodiments, the plurality of branches in one domain form an included angle with the plurality of branches in the adjacent domain in the same pixel electrode of the same subpixel.

Figure 3:
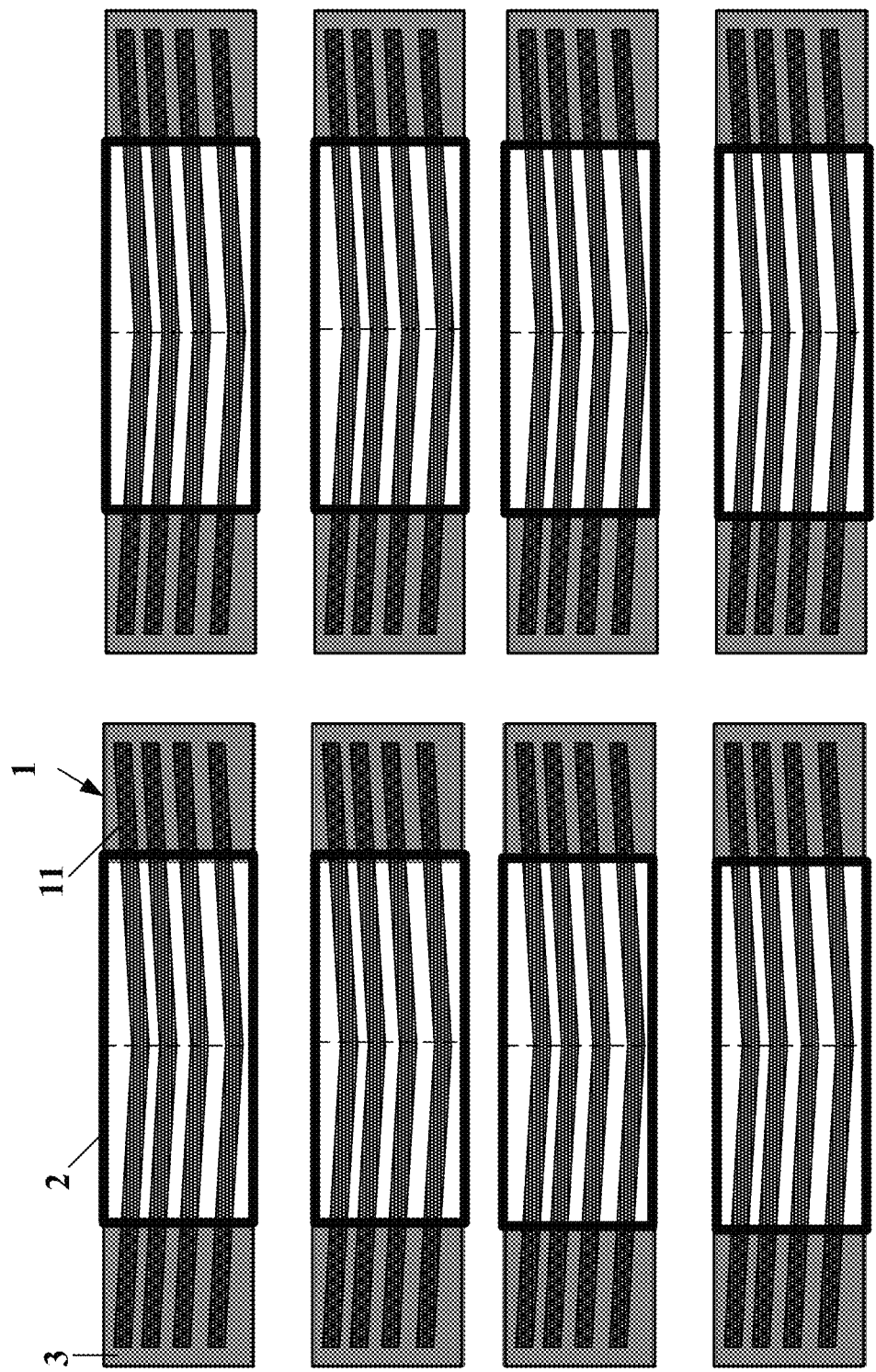
FIG. 3 is a diagram illustrating the structure of an array substrate in some embodiments according to the present disclosure.

FIG. 3 is a diagram illustrating the structure of an array substrate in some embodiments according to the present disclosure. The array substrate in the embodiment is in a state when the display panel is in a substantially flat state (e.g., not yet curved). Referring to FIG. 3, the black matrix opening 2 is aligned to the center of the pixel electrode 1. The position of the black matrix opening 2 also corresponds to the color filter on the counter substrate. As shown in FIG. 3, the plurality of branches of two domains in an area corresponding to the black matrix opening 2 have an axisymmetry with respect to an axis between two domains.

Figure 4:
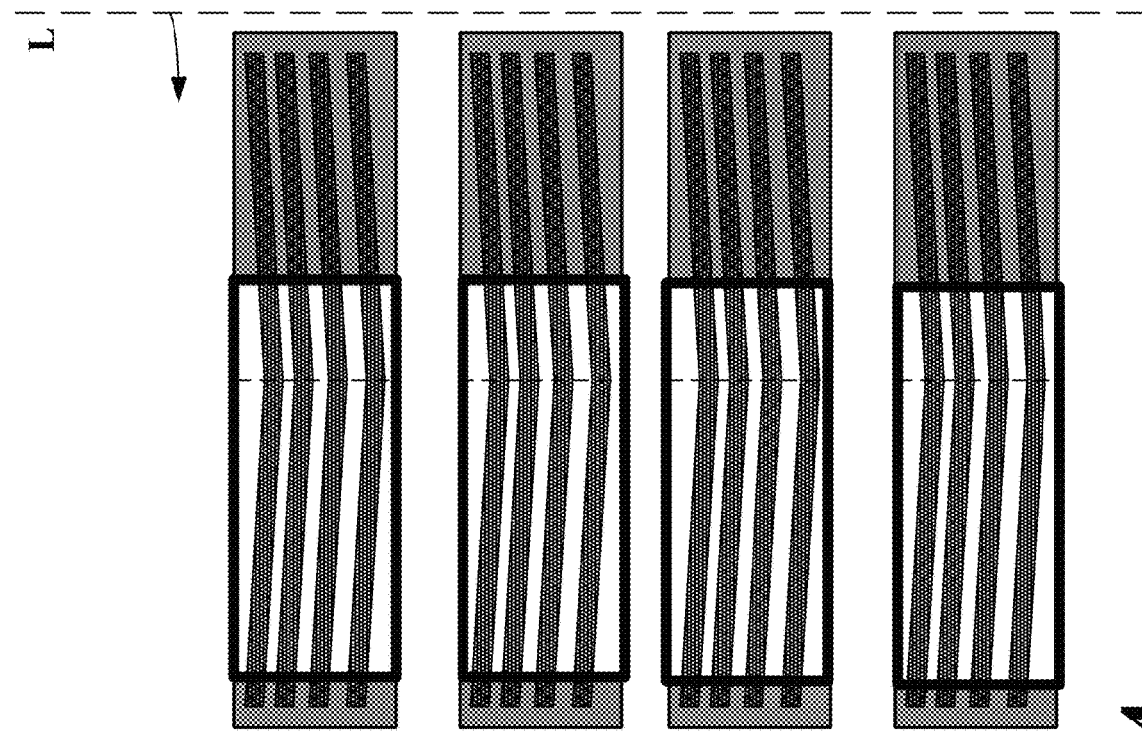
FIG. 4 is a diagram illustrating the structure of an array substrate in some embodiments according to the present disclosure.
Figure 4:
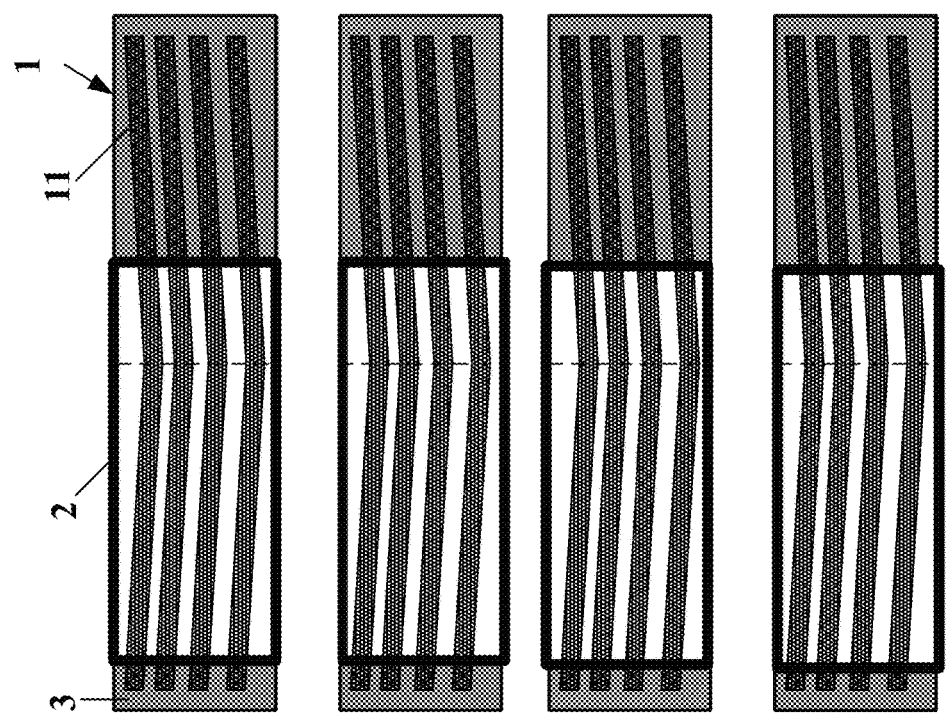

FIG. 4 is a diagram illustrating the structure of an array substrate in some embodiments according to the present disclosure. The array substrate in the embodiment is in a state when the display panel is in a curved with respect to an axis L. Referring to FIG. 4, when the display panel is in a curved, an offset occurs between the black matrix opening 2 offsets with the pixel electrode 1. The plurality of branches of two domains in an area corresponding to the black matrix opening 2 no longer have an axisymmetry, resulting in color shift and a decreased aperture ratio.

Accordingly, the present disclosure provides an array substrate in which each of the plurality of pixel electrodes has a plurality of domains and has at least a plurality of first branches extending along a first direction and a plurality of second branches extending along a second direction; the first direction being different from the second direction. In some embodiments, a sum of areas occupied by first branches in a first region of a first subpixel is substantially equal to a sum of area occupied by second branches in a second region of a second subpixel; and a sum of areas occupied by second branches in a first region of a first subpixel is substantially equal to a sum of area occupied by first branches in a second region of a second subpixel; the first subpixel and the second subpixel being two adjacent subpixels along the row direction; and the first region and the second region are two equivalent regions in the first subpixel and the second subpixel, respectively; the first region and the second region are small than a pixel electrode.

Figure 5:
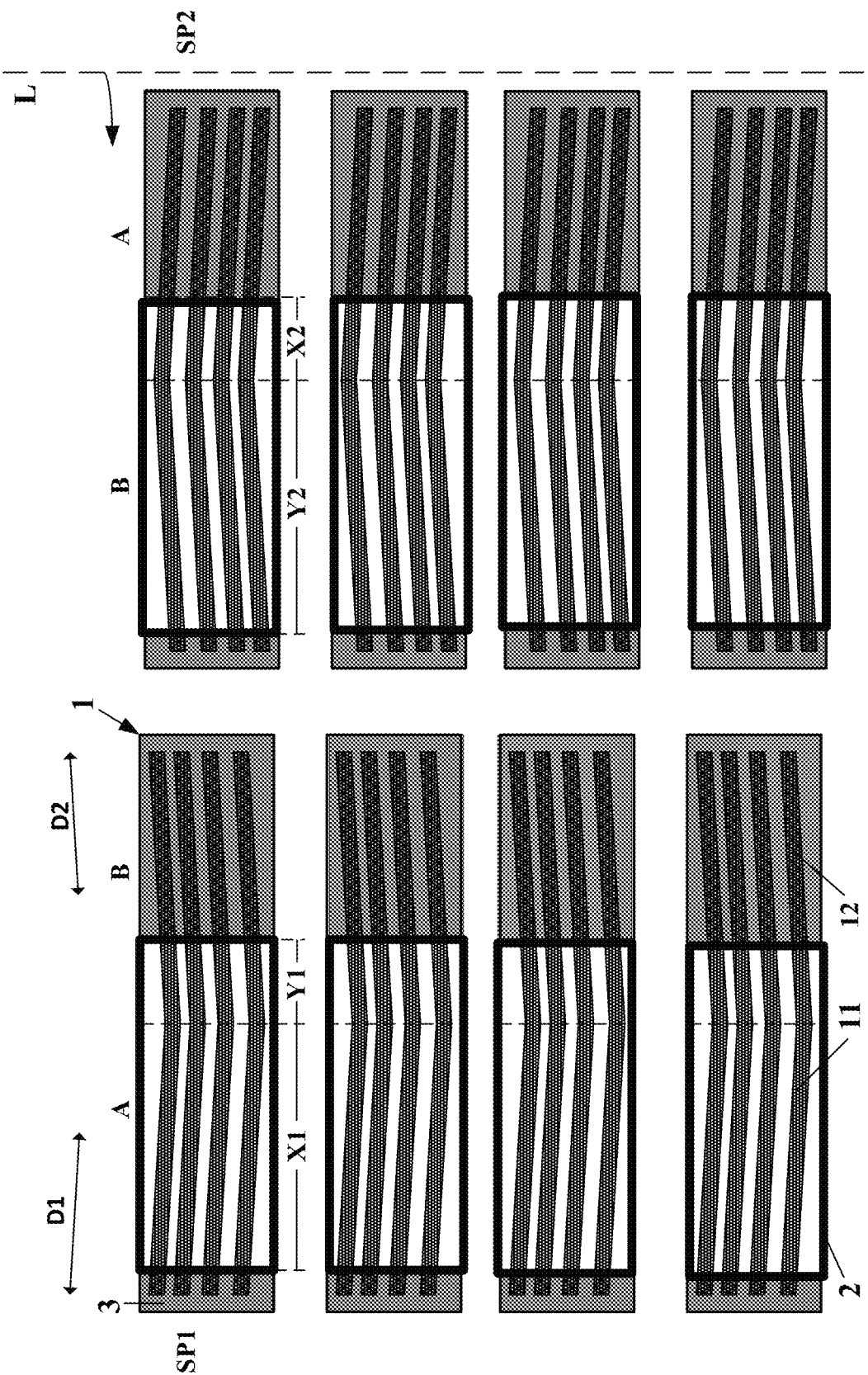
FIG. 5 is a diagram illustrating the structure of an array substrate in some embodiments according to the present disclosure.

FIG. 5 is a diagram illustrating the structure of an array substrate in some embodiments according to the present disclosure. Referring to FIG. 5, each pixel electrode includes a first domain A and a second domain B. The first domain A includes a plurality of first branches 11 extending along a first direction D1, the second domain B includes a plurality of second branches 12 extending along a second direction D2; the second direction D2 being different from the first direction D1. For example, a first subpixel SP1 on the top left side of the array substrate includes a first domain A on the left and a second domain B on the right, a second subpixel SP2 adjacent to the first subpixel SP1 along the row direction (on the top right side of the array substrate) includes a second domain B on the left and a first domain A on the right. Adjacent domains between the first subpixel SP1 and the second subpixel SP2 extend along difference directions. For example, the second domain B in the first subpixel SP1 is adjacent to the second domain B in the second subpixel SP2 along the row direction. Optionally, the first domain A in the first subpixel SP1 is adjacent to the first domain A in the second subpixel SP2 along the row direction.

Referring to FIG. 5, the plurality of first branches 11 in the first domain A and the plurality of second branches 12 in the second domain B in a same subpixel have a substantially mirror symmetry with respect to each other. The plurality of first branches 11 in the first domain A and the plurality of second branches 12 in the second domain B in a same subpixel have an axisymmetry with respect to an axis located between the first domain A and the second domain B. A first pattern including the first domain A and the second domain B in the first subpixel SP1 and a second pattern including the first domain A and the second domain B in the second subpixel SP2 have a substantially two-fold rotational symmetry in plan view of the array of subpixels.

By having this design, when an offset between the black matrix opening 2 offsets with the pixel electrode 1 occurs, the first subpixel SP1 has more first branches 11 in an area corresponding to the black matrix opening 2, however, the second subpixel SP2 has more second branches 12 in the area corresponding to the black matrix opening 2. As shown in FIG. 5, a sum of areas occupied by first branches 11 in a first region (e.g., a region corresponding to the black matrix opening 2) of a first subpixel SP1 is substantially equal to a sum of area occupied by second branches 12 in a second region (e.g., a region corresponding to the black matrix opening 2) of a second subpixel SP2; and a sum of areas occupied by second branches 12 in a first region of a first subpixel SP1 is substantially equal to a sum of area occupied by first branches 11 in a second region of a second subpixel SP2. The first region and the second region may be any equivalent regions in the first subpixel SP and the second subpixel SP2, respectively, and are small that a pixel electrode. For example, the first region and the second region may be two regions in the first subpixel SP1 and the second subpixel SP2, respectively, that are located at equivalent positions in the first subpixel SP1 and the second subpixel SP2. Optionally, the first region is a region in the first subpixel SP1 corresponding to the black matrix opening 2 in the first subpixel SP1, and the second region is a region in the second subpixel SP2 corresponding to the black matrix opening 2 in the second subpixel SP2.

In some embodiments, a sum of areas occupied by first branches 11 in two equivalent regions in two adjacent subpixels along the row direction is substantially equal to a sum of areas occupied by second branches 12 in the two equivalent regions. For example, as shown in FIG. 5, when the first region is a region in the first subpixel SP1 corresponding to the black matrix opening 2 in the first subpixel SP1, and the second region is a region in the second subpixel SP2 corresponding to the black matrix opening 2 in the second subpixel SP2, the sum of areas occupied by first branches 11 in two adjacent regions along the row direction is X1+X2, and the sum of areas occupied by second branches 12 in the two adjacent regions is Y1+Y2. As shown in FIG. 5, (X1+X2)=(Y1+Y2). As a result, the areas occupied by the first branches 11 in the array of subpixels are substantially the same as the areas occupied by the second branches 12 in the array of subpixels, color shift may be prevented.

In FIG. 5, a first pattern including the first domain A and the second domain B in the first subpixel SP1 and a second pattern including the first domain A and the second domain B in the second subpixel SP2 have a substantially two-fold rotational symmetry in plan view of the array of subpixels. The pixel electrodes in the present array substrate may be made to have various alternative patterns. For example, in some embodiments, the first pattern and the second pattern may not have a two-fold rotational symmetry, but still the sum of areas occupied by first branches 11 in two equivalent regions in two adjacent subpixels along the row direction is maintained to be substantially equal to the sum of areas occupied by second branches 12 in the two equivalent regions, color shift may be substantially prevented or reduced.

In some embodiments, the array substrate includes one or more vias in the pixel electrodes. Due to the presence of the vias in the pixel electrodes, the first subpixel and the second subpixel along the row direction may not have branch patterns having perfect two-fold rotational symmetry in plan view of the array of subpixels. However, in two adjacent first subpixel and second subpixel along the row direction in such an array substrate, the second domain in the first subpixel is adjacent to the second domain in the second subpixel along the row direction. For example, the first domain in the first subpixel is on a side of the second domain in the first subpixel distal to the second subpixel, and the first domain in the second subpixel is on a side of the second domain in the second subpixel distal to the first subpixel. Referring to FIG. 5, the first branches 11 and the second branches 12 in the first subpixel SP1 (top left side of the array of subpixels in FIG. 5) form an included angle, the opening of which points upwards. The first branches 11 and the second branches 12 in the second subpixel SP2 (top right side of the array of subpixels in FIG. 5) form an included angle, the opening of which points downwards. Thus, the openings of the included angles in the first subpixel SP1 and the second subpixel SP2 are oriented in two opposite directions.

In FIG. 5, the offset between the black matrix opening 2 and the pixel electrode 1 is shifted to the left with respect to the center of the pixel electrode. Optionally, the offset between the black matrix opening 2 and the pixel electrode 1 is shifted to the right with respect to the center of the pixel electrode.

In FIG. 5, in an area corresponding to the black matrix opening 2 in each subpixel in the left column, the area occupied by the first branches 11 is larger than the area occupied by the second branches 12. In an area corresponding to the black matrix opening 2 in each subpixel in the right column, the area occupied by the second branches 12 is larger than the area occupied by the first branches 11. As a result, a stripe pattern occurs in the display apparatus during image display.

Accordingly, the pixel electrodes in the array substrate can be arranged so that a sum of areas occupied by first branches in a first region of a first subpixel and a second region of a second subpixel is substantially equal to a sum of area occupied by second branches in the first region of the first subpixel and the second region of the second subpixel. The first region and the second region may be any equivalent regions in the first subpixel and the second subpixel, respectively, that are small that a pixel electrode. For example, the first region and the second region may be two regions in the first subpixel and the second subpixel, respectively, that are located at equivalent positions in the first subpixel and the second subpixel. Optionally, the first region is a region in the first subpixel corresponding to the black matrix opening in the first subpixel, and the second region is a region in the second subpixel corresponding to the black matrix opening in the second subpixel. By having this design, stripe pattern on the display apparatus may be prevented.

In some embodiments, a sum of areas occupied by first branches in a first region of a first subpixel is substantially equal to a sum of area occupied by second branches in a second region of a second subpixel; a sum of areas occupied by second branches in a first region of a first subpixel is substantially equal to a sum of area occupied by first branches in a second region of a second subpixel; the first subpixel and the second subpixel being two adjacent subpixels along the column direction.

Figure 6:
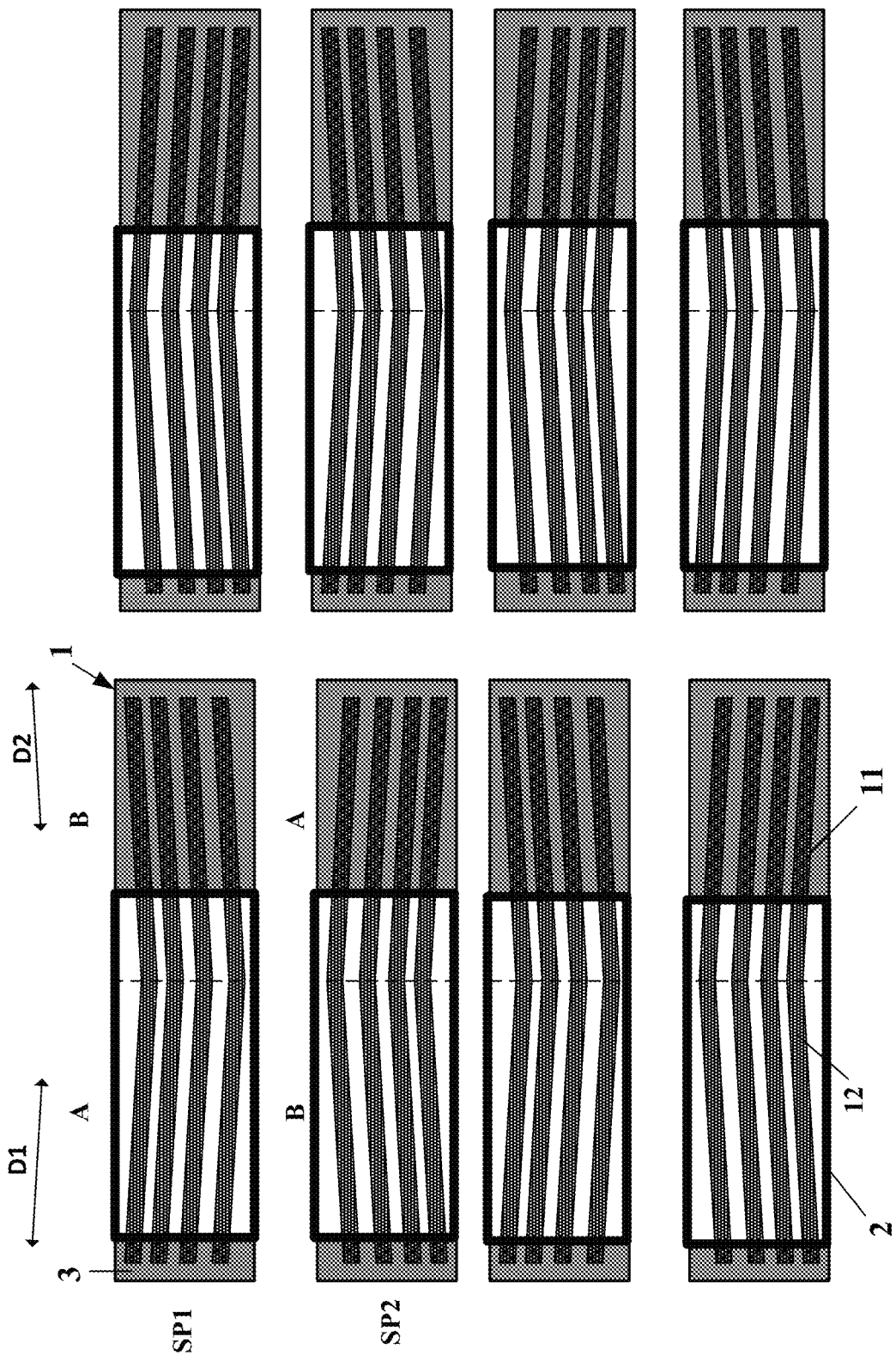
FIG. 6 is a diagram illustrating the structure of an array substrate in some embodiments according to the present disclosure.

FIG. 6 is a diagram illustrating the structure of an array substrate in some embodiments according to the present disclosure. Referring to FIG. 6, each pixel electrode includes a first domain A and a second domain B. The first domain A includes a plurality of first branches 11 extending along a first direction D1, the second domain B includes a plurality of second branches 12 extending along a second direction D2; the second direction D2 being different from the first direction D1. For example, a first subpixel SP1 includes a first domain A on the left and a second domain B on the right, a second subpixel SP2 adjacent to the first subpixel SP1 along the column direction includes a second domain B on the left and a first domain A on the right.

Referring to FIG. 6, a first pattern including the first domain A and the second domain B in the first subpixel SP1 and a second pattern including the first domain A and the second domain B in the second subpixel SP2 have a substantially mirror symmetry with respect to each other. A first pattern including the first domain A and the second domain B in the first subpixel SP1 and a second pattern including the first domain A and the second domain B in the second subpixel SP2 have a substantially two-fold rotational symmetry in plan view of the array of subpixels.

In some embodiments, the array substrate includes one or more vias in the pixel electrodes. Due to the presence of the vias in the pixel electrodes, the first subpixel and the second subpixel along the column direction may not have branch patterns having perfect two-fold rotational symmetry in plan view of the array of subpixels. However, in two adjacent first subpixel and second subpixel along the column direction in such an array substrate, the first domain in the first subpixel is adjacent to the second domain in the second subpixel along the column direction, and the second domain in the first subpixel is adjacent to the first domain in the second subpixel along the column direction. Referring to FIG. 6, the first branches 11 and the second branches 12 in the first subpixel SP1 form an included angle, the opening of which points upwards. The first branches 11 and the second branches 12 in the second subpixel SP2 form an included angle, the opening of which points downwards. Thus, the openings of the included angles in the first subpixel SP1 and the second subpixel SP2 are oriented in two opposite directions.

Figure 7:
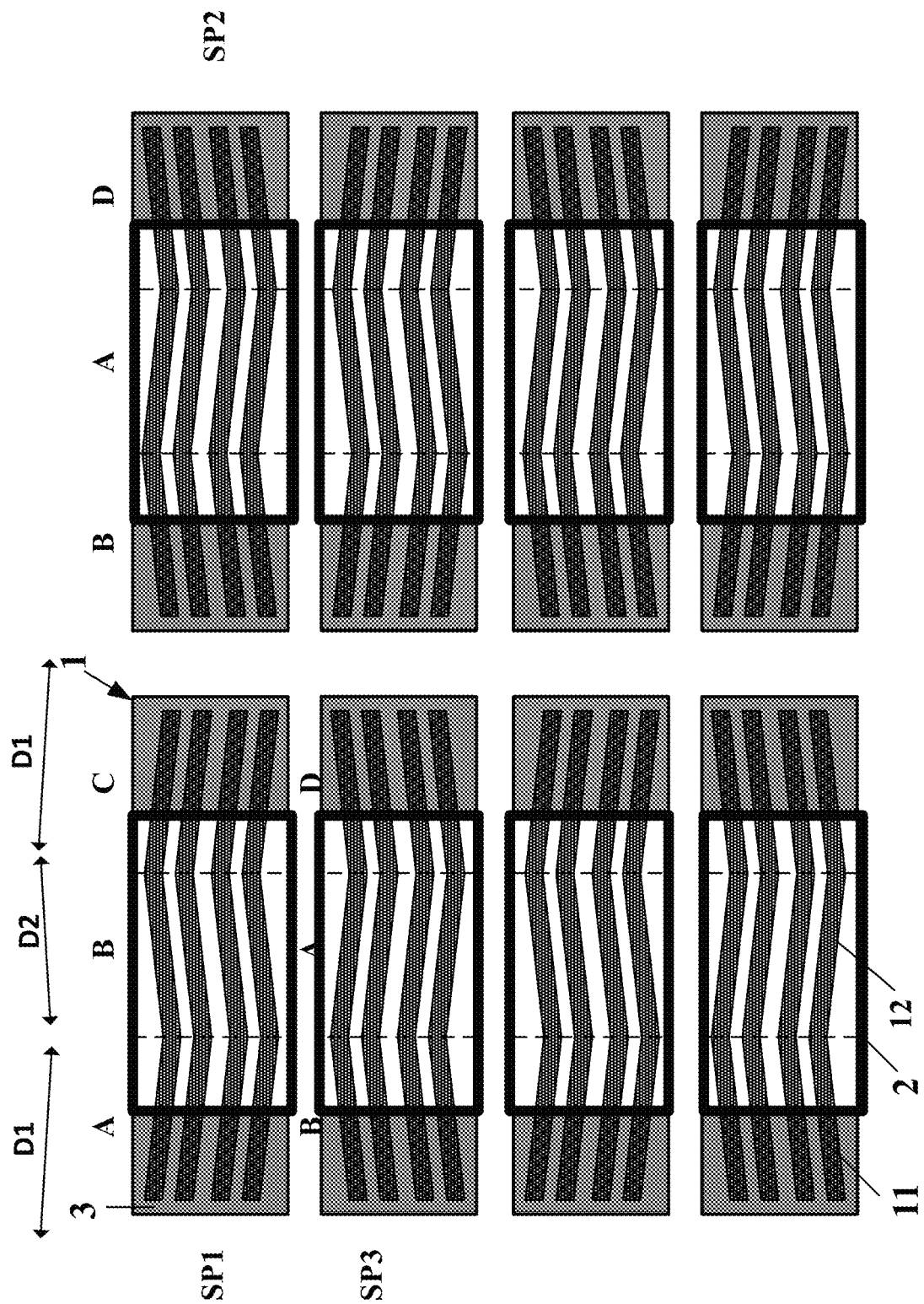
FIG. 7 is a diagram illustrating the structure of an array substrate in some embodiments according to the present disclosure.

In some embodiments, each pixel electrode in the present array substrate includes more than two domains. FIG. 7 is a diagram illustrating the structure of an array substrate in some embodiments according to the present disclosure. Referring to FIG. 7, each pixel electrode in the embodiment includes three domains. The first subpixel SP1 includes a first domain A, a second domain B, and a third domain C. The first domain A includes a plurality of first branches 11 extending along a first direction D1, the second domain B includes a plurality of second branches 12 extending along a second direction D2; and the third domain C includes a plurality of first branches 11 extending along a first direction D1; the second direction D2 being different from the first direction D1. The first domain A, the second domain B, and the third domain C, are sequentially arranged substantially along the row direction.

Referring to FIG. 7, the plurality of first branches 11 in the first domain A and the plurality of second branches 12 in the second domain B in a same subpixel SP1 have mirror symmetry with respect to each other, and the plurality of second branches 12 in the second domain B and the plurality of first branches 11 in the third domain C in the same subpixel SP1 have a substantially mirror symmetry with respect to each other. The plurality of first branches 11 in the first domain A and the plurality of second branches 12 in the second domain B in a same subpixel SP1 have an axisymmetry with respect to the axis between the first domain A and the second domain B, and the plurality of second branches 12 in the second domain B and the plurality of first branches 11 in the third domain C in the same subpixel SP1 have an axisymmetry with respect to the axis between the second domain B and the third domain C.

Along the row direction, a second subpixel SP2 adjacent to the first subpixel SP1 includes a second domain B, a first domain A, and a fourth domain D. The second domain B includes a plurality of second branches 12 extending along a second direction D2; the first domain A includes a plurality of first branches 11 extending along a first direction D1, and the fourth domain D includes a plurality of second branches 12 extending along a second direction D2; the second direction D2 being different from the first direction D1. The second domain B, the first domain A, and the fourth domain D, are sequentially arranged substantially along the row direction. Branches in adjacent domains between the first subpixel SP1 and the second subpixel SP2 extend along difference directions. For example, the third domain C in the first subpixel SP1 is adjacent to the second domain B in the second subpixel SP2 along the row direction. Optionally, the first domain A in the first subpixel SP1 is adjacent to the fourth domain D in the second subpixel SP2 along the row direction.

Along the column direction, a third subpixel SP3 adjacent to the first subpixel SP1 includes a second domain B, a first domain A, and a fourth domain D. The second domain B includes a plurality of second branches 12 extending along a second direction D2; the first domain A includes a plurality of first branches 11 extending along a first direction D1, and the fourth domain D includes a plurality of second branches 12 extending along a second direction D2; the second direction D2 being different from the first direction D1. The second domain B, the first domain A, and the fourth domain D, are sequentially arranged substantially along the row direction. Branches in adjacent domains between the first subpixel SP1 and the third subpixel SP3 extend along difference directions. For example, the first domain A in the first subpixel SP1 is adjacent to the second domain B in the third subpixel SP3 along the column direction; the second domain B in the first subpixel SP1 is adjacent to the first domain A in the third subpixel SP3 along the column direction; and the third domain C in the first subpixel SP1 is adjacent to the fourth domain D in the third subpixel SP3 along the column direction.

Figure 8:
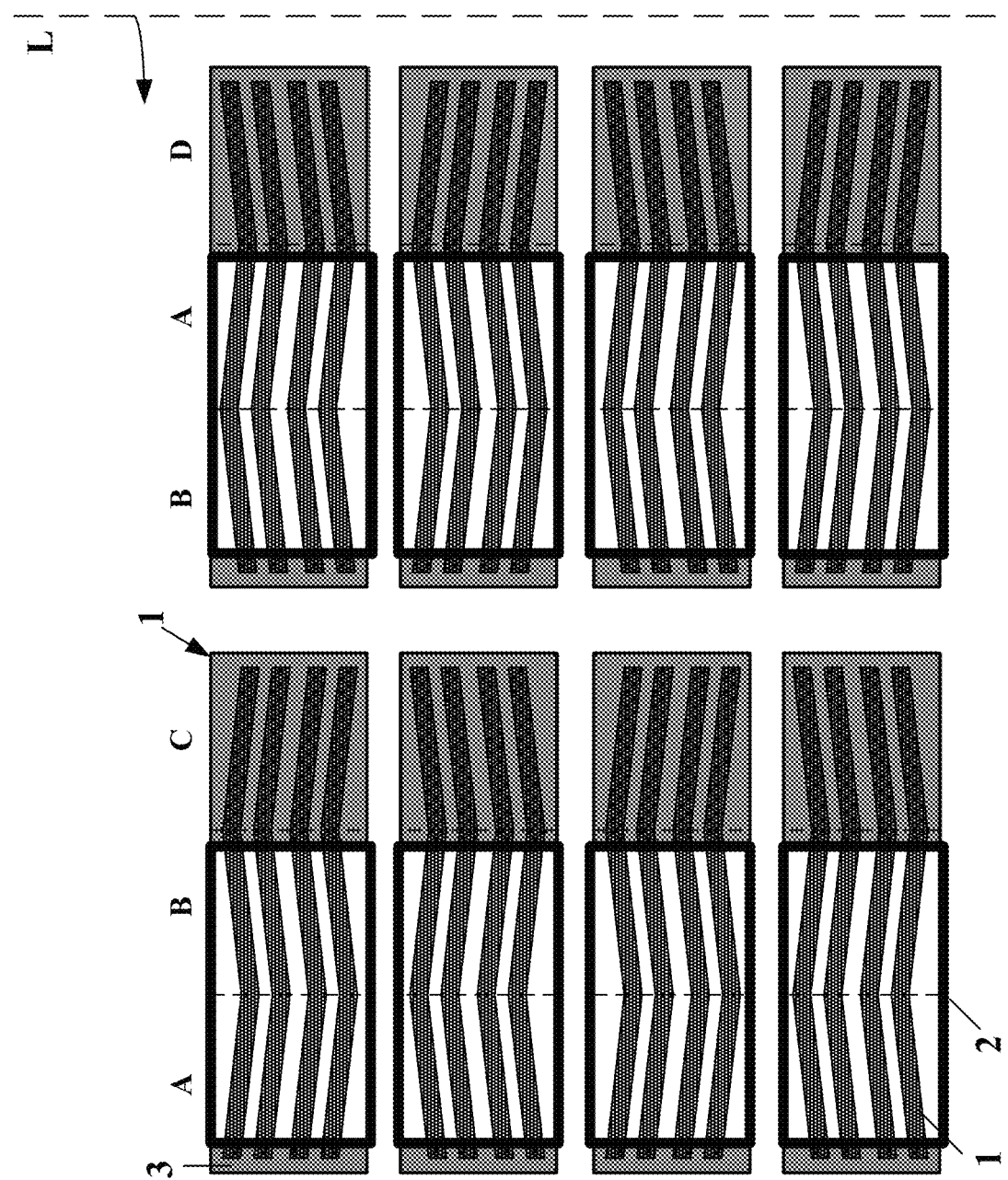
FIG. 8 is a diagram illustrating the structure of an array substrate in some embodiments according to the present disclosure.

Referring to FIG. 7, the array substrate in the embodiment is in a state in which the display apparatus is in a substantially flat state (e.g., not curved). As shown in FIG. 7, the black matrix opening 2 is aligned with the center of each pixel electrode 1. FIG. 8 is a diagram illustrating the structure of an array substrate in some embodiments according to the present disclosure. FIG. 8 shown the array substrate in a state in which the display apparatus is curved. The black matrix opening 2 is offset with respect to the pixel electrode 1. In some embodiments, as shown in FIG. 8, the black matrix opening 2 is substantially aligned with the interface between the first domain A and the second domain B. The pattern of first branches 1 and second branches 2 in an area corresponding to the black matrix opening 2 has a substantially mirror symmetry or substantially an axisymmetry with respect to an axis along the interface between the first domain A and the second domain B.

In some embodiments, the size of each domain of the pixel electrode can be determined based on the offset width. The array substrate can be designed so that, when the display apparatus is in a curved state, the pattern of branches in an area corresponding to the black matrix opening has a substantially mirror symmetry or substantially an axisymmetry. By having this design, color shift in the display apparatus can be improved.

In some curved display panels, the black matrix layer is disposed on the counter substrate. Optionally, the pattern of branches in an area corresponding to the black matrix opening has a substantially mirror symmetry or substantially an axisymmetry. In some curved display panels, the black matrix layer is disposed on the array substrate. Optionally, the pattern of branches in an area corresponding to the color filter block has a substantially mirror symmetry or substantially an axisymmetry.

In some embodiments, the curved display panel further includes a black matrix layer in an inter-subpixel region of the curved display panel. The curved display panel further includes a counter substrate facing the array substrate. Optionally, the black matrix layer is disposed in the array substrate. Optionally, the black matrix is disposed in the counter substrate. In some embodiments, the curved display panel further includes a liquid crystal layer between the array substrate and the counter substrate.

In some embodiments, each of the plurality of pixel electrodes includes a first domain having a plurality of first branches extending along the first direction; a second domain having a plurality of second branches extending along the second direction; and a third domain having a plurality of first branches extending along the first direction; the first domain; the second domain, and a third domain being sequentially arranged substantially along the row direction. The plurality of first branches in the first domain and the plurality of second branches in the second domain in a same subpixel have a substantially mirror symmetry with respect to each other, and the plurality of second branches in the second domain and the plurality of first branches in the third domain in the same subpixel have a substantially mirror symmetry with respect to each other. A projection of the third domain on the curved display panel overlaps with that of the black matrix layer. A projection of the first domain and the second domain on the curved display panel is at least partially outside that of the black matrix layer. The portion of the first domain and the second domain whose projection is outside that of the black matrix layer has a pattern of first branches and second branches having a substantially mirror symmetry or substantially an axisymmetry.

Figure 9:
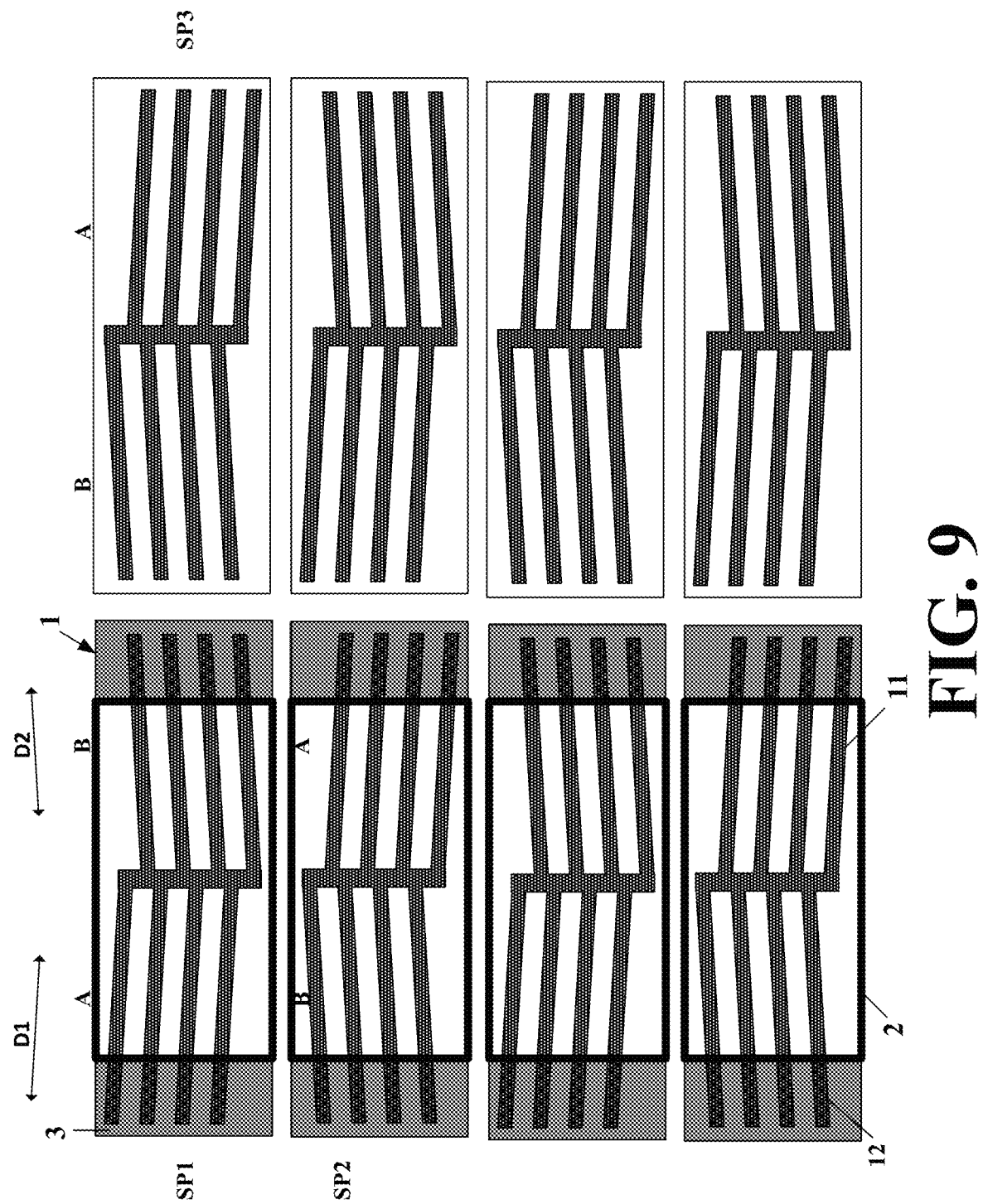
FIG. 9 is a diagram illustrating the structure of an array substrate in some embodiments according to the present disclosure.

The pixel electrode may be designed to have various alternative structures. FIG. 9 illustrates a pixel electrode structure in which each pixel electrode has a plurality of domains A and B, and includes at least a plurality of first branches 11 in domain A extending along a first direction D1 and a plurality of second branches 12 in domain B extending along a second direction D2, the first direction D1 is different from the second direction D2. The first branches 11 and the second branches 12 in each pixel electrode offset from each other, thereby destroying any mirror symmetry or axisymmetry. In FIG. 9, however, a sum of areas occupied by first branches 11 in a first region of a first subpixel SP1 and a second region of a second subpixel SP2 is substantially equal to a sum of area occupied by second branches 12 in the first region of the first subpixel SP1 and the second region of the second subpixel SP2, the first subpixel SP1 and the second subpixel SP2 are two adjacent subpixels along the row direction. The first region and the second region are two equivalent regions in the first subpixel SP1 and the second subpixel SP2, respectively; the first region and the second region are small than a pixel electrode. In FIG. 9, the first region and the second region are black matrix opening 2 in the first subpixel SP1 and the second subpixel SP2. Additionally, a first pattern including the first domain A and the second domain B in the first subpixel SP1 and a second pattern including the first domain A and the second domain B in the second subpixel SP2 have a substantially two-fold rotational symmetry in plan view of the array of subpixels.

Similarly, in FIG. 9, a sum of areas occupied by first branches in a first region of a first subpixel SP1 and a third region of a third subpixel SP3 is substantially equal to a sum of area occupied by second branches 12 in the first region of the first subpixel SP1 and the third region of the third subpixel SP3, the first subpixel SP1 and the third subpixel SP3 are two adjacent subpixels along the column direction. The first region and the second region are two equivalent regions in the first subpixel SP1 and the third subpixel SP3, respectively; the first region and the third region are small than a pixel electrode. In FIG. 9, the first region and the third region are black matrix opening 2 in the first subpixel SP1 and the third subpixel SP3.

In another aspect, the present disclosure provides an array substrate in which the black matrix layer and the pixel electrode do not offset with each other along the row direction of the array substrate. In some embodiments, the black matrix layer is absent in an inter-subpixel region between adjacent subpixels along the row direction, and liquid crystal molecules in the liquid crystal layer in the inter-subpixel region between adjacent subpixels along the row direction have a rotation angle corresponding to a normally black mode.

Figure 10:
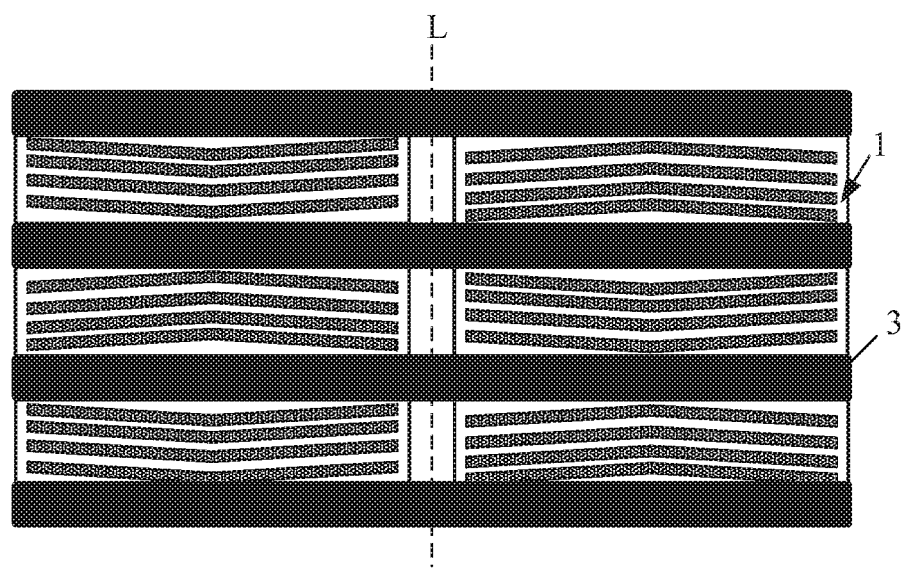
FIG. 10 is a diagram illustrating the structure of a black matrix layer and an array substrate in a display apparatus in some embodiments according to the present disclosure.

FIG. 10 is a diagram illustrating the structure of a black matrix layer and an array substrate in a display apparatus in some embodiments according to the present disclosure. Referring to FIG. 10, the curved display panel in the embodiment includes a black matrix layer 3. The black matrix layer 3 is disposed in an inter-subpixel region between adjacent subpixels along the column direction, but is absent in the inter-subpixel region between adjacent subpixels along the row direction. When the display apparatus is curved with respect to the axis L, an offset occurs between the black matrix layer 3 and the array substrate. However, the black matrix layer 3 does not overlap with the pixel electrode 1, and no offset occurs between the black matrix layer 3 and the pixel electrode 1. The liquid crystal molecules in the liquid crystal layer in the inter-subpixel region between adjacent subpixels along the row direction have a rotation angle corresponding to a normally black mode. By having this design, light leakage in the inter-subpixel region between adjacent subpixels along the row direction can be effectively prevented while the offset between the black matrix layer and the pixel electrode is obviated.

In another aspect, the present disclosure provides a curved display apparatus having a curved display panel described herein. Examples of appropriate curved display apparatuses include, but are not limited to, an electronic paper, a mobile phone, a tablet computer, a television, a monitor, a notebook computer, a digital album, a GPS, etc. Optionally, the curved display apparatus is a liquid crystal display apparatus. Optionally, the curved display apparatus is an organic light emitting display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A curved display panel having an array substrate comprising an array of subpixels arranged in rows and columns, the array substrate comprising:
   a plurality of pixel electrodes corresponding to the array of subpixels; a respective one of the plurality of pixel electrodes being in a subpixel and having a first dimension along a row direction and a second dimension along a column direction;
   wherein the curved display panel is curved with respect to an axis substantially parallel to the column direction; and
   the first dimension is larger than the second dimension;
   the respective one of the plurality of pixel electrodes comprises a first domain comprising a plurality of first branches extending along a first direction and a second domain comprising a plurality of second branches extending along a second direction, the second direction being different from the first direction;
   the first domain and the second domain in a same subpixel lack a two-fold rotational symmetry with respect to each other in plan view of the array of subpixels;
   along the column direction first domains and second domains are alternately arranged, three adjacent alternately arranged domains along the column direction being respectively from three adjacent subpixels;
   along the column direction a respective first domain in a respective first subpixel is directly adjacent to two second domains respectively from two first neighboring subpixels along the column direction;
   along the column direction, first branches extending along the first direction of the respective first domain of a respective first pixel electrode in the respective first subpixel are directly adjacent to second branches extending along the second direction of a first directly adjacent second domain of a respective second pixel electrode in a first directly adjacent subpixel on one side, and are directly adjacent to second branches extending along the second direction of a second directly adjacent second domain of a respective third pixel electrode in a second directly adjacent subpixel on another side;
   along the column direction a respective second domain in a respective second subpixel is directly adjacent to two first domains respectively from two second neighboring subpixels along the column direction; and
   along the column direction, second branches extending along the second direction of the respective second domain of a respective fourth pixel electrode in the respective second subpixel are directly adjacent to first branches extending along the first direction of a first directly adjacent first domain of a respective fifth pixel electrode in a third directly adjacent subpixel on one side, and are directly adjacent to first branches extending along the first direction of a second directly adjacent first domain of a respective sixth pixel electrode in a fourth directly adjacent subpixel on another side.

2. The curved display panel of claim 1, wherein the respective one of the plurality of pixel electrodes has a rectangular shape, a short side of which is substantially parallel to the axis.

3. The curved display panel of claim 1, wherein along the column direction patterns of two directly adjacent pixel electrodes of the plurality of pixel electrodes lack translational symmetry.

4. The curved display panel of claim 1, wherein a sum of areas occupied by first branches in a first region of a first subpixel and a second region of a second subpixel is substantially equal to a sum of area occupied by second branches in the first region of the first subpixel and the second region of the second subpixel;
   the first subpixel and the second subpixel are two adjacent subpixels along the row direction; and
   the first region and the second region are two equivalent regions in the first subpixel and the second subpixel, respectively; the first region and the second region are small than a pixel electrode.

5. The curved display panel of claim 4, wherein along the column direction patterns of two directly adjacent pixel electrodes of the plurality of pixel electrodes have a substantially two-fold rotational symmetry in plan view of the array of subpixels.

6. The curved display panel of claim 4, wherein the second domain in the first subpixel is adjacent to the second domain in the second subpixel along the row direction.

7. The curved display panel of claim 4, wherein a first pattern comprising the first domain and the second domain in the first subpixel and a second pattern comprising the first domain and the second domain in the second subpixel have a substantially two-fold rotational symmetry in plan view of the array of subpixels.

8. The curved display panel of claim 4, wherein a sum of areas occupied by first branches in a first region of the first subpixel and a second region of the second subpixel is substantially equal to a sum of area occupied by second branches in the first region of the first subpixel and the second region of the second subpixel;

the first subpixel and the second subpixel are two adjacent subpixels along the column direction; and the first region and the second region are two equivalent regions in the first subpixel and the second subpixel, respectively; the first region and the second region are small than a pixel electrode.

9. The curved display panel of claim 1, wherein all domains in an individual one of the plurality of pixel electrodes are sequentially arranged in a single row.

10. The curved display panel of claim 1, wherein the respective one of the plurality of pixel electrodes further comprises a third domain comprising a plurality of first branches extending along the first direction; and the first domain, the second domain, and a third domain sequentially arranged substantially along the row direction.

11. The curved display panel of claim 10, wherein the plurality of first branches in the first domain and the plurality of second branches in the second domain in a same subpixel have mirror symmetry with respect to each other; and the plurality of second branches in the second domain and the plurality of first branches in the third domain in the same subpixel have a substantially mirror symmetry with respect to each other.

12. The curved display panel of claim 10, wherein the second domain and the third domain in a same subpixel lack a two-fold rotational symmetry with respect to each other in plan view of the array of subpixels.

13. A curved display apparatus, comprising a curved display panel of claim 1.

14. A curved display panel, comprising:

an array substrate comprising an array of subpixels arranged in rows and columns:

wherein the array substrate comprising:

a plurality of pixel electrodes corresponding to the array of subpixels; a respective one of the plurality of pixel electrodes being in a subpixel and having a first dimension along a row direction and a second dimension along a column direction;

wherein the curved display panel is curved with respect to an axis substantially parallel to the column direction; and the first dimension is larger than the second dimension;

wherein the respective one of the plurality of pixel electrodes comprises a first domain comprising a plurality of first branches extending along a first direction and a second domain comprising a plurality of second branches extending along a second direction, the second direction being different from the first direction;

a first pixel electrode in a first subpixel comprises the first domain comprising the plurality of first branches extending along the first direction, the second domain comprising the plurality of second branches extending along the second direction, and a third domain comprising the plurality of first branches extending along the first direction; and the first domain, the second domain, and a third domain sequentially arranged substantially along the row direction; and a second pixel electrode in a second subpixel further comprises the first domain comprising the plurality of first branches extending along the first direction, the second domain comprising the plurality of second branches extending along the second direction, and a fourth domain comprising the plurality of second branches extending along the second direction; and the second domain, the first domain, and a fourth domain sequentially arranged substantially along the row direction;

the first subpixel and the second subpixel are two adjacent subpixels along the column direction;

wherein the first domain in the first subpixel is adjacent to the second domain in the second subpixel along the column direction;

the second domain in the first subpixel is adjacent to the first domain in the second subpixel along the column direction; and the third domain in the first subpixel is adjacent to the fourth domain in the second subpixel along the column direction;

along the column direction first domains and second domains are alternately arranged, three adjacent alternately arranged domains along the column direction being respectively from three adjacent subpixels;

along the column direction third domains and fourth domains are alternately arranged, three adjacent alternately arranged domains along the column direction being respectively from three adjacent subpixels;

along the column direction a respective first domain in a respective first subpixel is directly adjacent to two second domains respectively from two first neighboring subpixels along the column direction;

along the column direction, first branches extending along the first direction of the respective first domain of a respective first pixel electrode in the respective first subpixel are directly adjacent to second branches extending along the second direction of a first directly adjacent second domain of a respective second pixel electrode in a first directly adjacent subpixel on one side, and are directly adjacent to second branches extending along the second direction of a second directly adjacent second domain of a respective third pixel electrode in a second directly adjacent subpixel on another side;

along the column direction a respective second domain in a respective second subpixel is directly adjacent to two first domains respectively from two second neighboring subpixels along the column direction;

along the column direction, second branches extending along the second direction of the respective second domain of a respective fourth pixel electrode in the respective second subpixel are directly adjacent to first branches extending along the first direction of a first directly adjacent first domain of a respective fifth pixel electrode in a third directly adjacent subpixel on one side, and are directly adjacent to first branches extending along the first direction of a second directly adjacent first domain of a respective sixth pixel electrode in a fourth directly adjacent subpixel on another side;

along the column direction a respective third domain in a respective third subpixel is directly adjacent to two fourth domains respectively from two third neighboring subpixels along the column direction;

along the column direction, first branches extending along the first direction of the respective third domain of a respective seventh pixel electrode in the respective third subpixel are directly adjacent to second branches extending along the second direction of a first directly adjacent fourth domain of a respective eighth pixel electrode in a fifth directly adjacent subpixel on one side, and are directly adjacent to second branches extending along the second direction of a second directly adjacent fourth domain of a respective ninth pixel electrode in a sixth directly adjacent subpixel on another side;

along the column direction a respective fourth domain in a respective fourth subpixel is directly adjacent to two third domains respectively from two fourth neighboring subpixels along the column direction; and along the column direction, second branches extending along the second direction of the respective fourth domain of a respective tenth pixel electrode in the respective fourth subpixel are directly adjacent to first branches extending along the first direction of a first directly adjacent third domain of a respective eleventh pixel electrode in a seventh directly adjacent subpixel on one side, and are directly adjacent to first branches extending along the first direction of a second directly adjacent third domain of a respective twelfth pixel electrode in an eighth directly adjacent subpixel on another side.

15. The curved display panel of claim 14, wherein all domains in an individual one of the plurality of pixel electrodes are sequentially arranged in a single row.

16. The curved display panel of claim 14, wherein the first domain and the second domain in a same subpixel lack a two-fold rotational symmetry with respect to each other in plan view of the array of subpixels; and the second domain and the third domain in a same subpixel lack a two-fold rotational symmetry with respect to each other in plan view of the array of subpixels.

17. A curved display panel, comprising:
an array substrate comprising an array of subpixels arranged in rows and columns; and
a black matrix layer in an inter-subpixel region of the curved display panel;
wherein the array substrate comprising:
a plurality of pixel electrodes corresponding to the array of subpixels; a respective one of the plurality of pixel electrodes being in a subpixel and having a first dimension along a row direction and a second dimension along a column direction;
wherein the curved display panel is curved with respect to an axis substantially parallel to the column direction; and
the first dimension is larger than the second dimension;
wherein the respective one of the plurality of pixel electrodes in a respective subpixel comprises a first domain comprising a plurality of first branches extending along a first direction; a second domain comprising a plurality of second branches extending along a second direction; and a third domain comprising a plurality of first branches extending along the first direction; the first domain; the second domain, and a third domain being sequentially arranged substantially along the row direction;

the plurality of first branches in the first domain and the plurality of second branches in the second domain in a same subpixel have a substantially mirror symmetry with respect to each other;

the plurality of second branches in the second domain and the plurality of first branches in the third domain in the same subpixel have a substantially mirror symmetry with respect to each other;

a projection of the third domain on the curved display panel overlaps with a projection of the black matrix layer on the curved display panel;

a projection of a first portion of the first domain on the curved display panel is outside the projection of the black matrix layer on the curved display panel;

a projection of a second portion of the first domain partially overlaps with the projection of the black matrix layer on the curved display panel;

a projection of a third portion of the second domain on the curved display panel is outside the projection of the black matrix layer on the curved display panel;

a projection of a fourth portion of the second domain partially overlaps with the projection of the black matrix layer on the curved display panel; and patterns of first branches of the first portion of the first domain and patterns of second branches of the third portion of the second domain has a substantially mirror symmetry.

18. The curved display panel of claim 17, wherein all domains in an individual one of the plurality of pixel electrodes are sequentially arranged in a single row.

19. The curved display panel of claim 17, wherein the first domain and the second domain in a same subpixel lack a two-fold rotational symmetry with respect to each other in plan view of the array of subpixels; and the second domain and the third domain in a same subpixel lack a two-fold rotational symmetry with respect to each other in plan view of the array of subpixels.

20. The curved display panel of claim 17, further comprising a counter substrate, and a liquid crystal layer between the array substrate and the counter substrate;
wherein the black matrix layer is absent in an inter-subpixel region between adjacent subpixels along the row direction; and
liquid crystal molecules in the liquid crystal layer in the inter-subpixel region between adjacent subpixels along the row direction have a rotation angle corresponding to a normally black mode.

* * * * *